United States Patent [19]

Cochran et al.

[11] 3,909,808

[45] Sept. 30, 1975

[54] MINIMUM PITCH MOSFET DECODER CIRCUIT CONFIGURATION

[75] Inventors: William Hugh Cochran, Dover; Dale Arthur Heuer, Stewartville; Michael James Sheehan, Rochester, all of Minn.

[73] Assignee: International Business Machines Corporation, Armonk, N.Y.

[22] Filed: Dec. 23, 1974

[21] Appl. No.: 535,748

[52] U.S. Cl. ..... 340/173 R; 340/172.5; 340/173 SP

[51] Int. Cl.² .......................................... G11C 11/40

[58] Field of Search ........ 340/172.5, 173 R, 173 SP

[56] References Cited

UNITED STATES PATENTS 3,821,715 6/1974 Hoff ............................ 340/173 SP

*Primary Examiner*—Terrell W. Fears
*Attorney, Agent, or Firm*—John G. Wynn

[57] ABSTRACT

MOSFET decoder circuit configuration for enhancing read/only storage memory densities by providing decoded output lines on a narrower pitch than conventional decoder circuits, thereby, increasing the number of decoded lines of the conventional decoder. In addition, the number of conventional decoder circuits required are reduced by a binary factor, thereby decreasing power requirements. Decoded line capability is increased by means of properly addressed array select devices whereby the number of array select devices required is equal to the particular binary factor utilized. For particular physical layout ground rules utilized in fabrication of an integrated decoder of the instant invention, the binary factor is chosen so that the decoder pitch is equal to the read/only storage memory pitch in order to obtain maximum chip density.

8 Claims, 8 Drawing Figures

MINIMUM PITCH MOSFET DECODER CIRCUIT CONFIGURATION

BACKGROUND OF THE INVENTION

1. Field of the Invention

This invention relates to a MOSFET decoder circuit configuration and, more particularly, to a decoder circuit configuration which results in an increase in the number of decoded lines of a conventional decoder circuit by a binary factor chosen.

2. Description of the Prior Art

One of the inherent advantages of the MOSFET technology is low cost, coupled with high reliable yields. Accordingly, to take advantage of the benefits of the technology, the ability to integrate more and more functions on a given chip size, consistent with higher yields, and improved reliability, is a challenge facing the technology.

In the recent past, for example, a series of AND gates or a series of NOR gates, which are the complement of AND gates, were used for decoding of logical input signals, i.e., addresses. The output of these gates are generally used to address memory matrices. As an example, for each group of AND circuits, hereinafter called AND blocks or conventional decoders, there is provided a plurality of logical input signals, depending on the operation to be performed, and there is one output decoded line for each conventional decoder. Associated with each conventional decoder is also a clock pulse input to provide the necessary switching logic for the proper operation of the devices. The conventional decoder blocks, aforementioned, are commonly used in the MOSFET large scale integration technology to provide addressing or accessing signals for read/only storage memory arrays, hereinafter called (ROS) memory. In past applications, where decoders and ROS memories were fabricated on the same chip, the density of the ROS memory was limited by the physical size of the address decoder. To put it another way, the number of address lines for the ROS memory was limited by the number of decoded output lines available from the conventional decoders for a particular chip size. Consequently, using MOSFET technology ground rules suitable for maximum density ROS memory fabrication put a restriction on the minimum pitch-minimum array dimensions achievable with these ground rules using conventional decoders, the limitation being the minimum pitch dimension of the conventional decoders. The result was that full ROS memory capability could not be utilized because the number of decoder circuits necessary to fully utilize the ROS memory storage capacity could not be fabricated on the same chip. Accordingly, to fully utilize the ROS memory densities, more chips were needed. In addition, since the minimum pitch dimensions for the conventional decoders and the ROS memories were not compatible, jogging the interconnecting or decoded lines on the chips were necessary, thus losing the use of valuable chip areas. Finally, since clock pulses are fed to each conventional decoder used to drive a ROS memory array, the more decoders needed, the more dynamic power required, thereby decreasing reliability of the total system.

OBJECTS OF THE INVENTION

Accordingly, it is an object of this invention to obtain decoded lines to a ROS memory array on a pitch narrower than available with conventional decoder circuits.

It is an important object of the present invention to increase the number of decoded lines from a conventional decoder limited only by a binary factor utilized.

It is another important object of the present invention to match decoder output line pitch to a ROS memory pitch.

It is still another important object of the instant invention to reduce the dynamic power required in a decoder circuit configuration by approximately the binary factor utilized.

It is yet another important object of this invention to remove the restriction on decoder pitch and place the pitch restriction on minimum ROS memory array dimensions.

It is yet an important object of the present invention to increase overall chip densities while maintaining high chip yields and reliability.

SUMMARY OF THE INVENTION

In accordance with these and other objects and features of the present invention, a minimum pitch MOSFET decoder circuit configuration is disclosed wherein the output line capability of a conventional decoder is increased by a particular binary factor chosen, i.e., $2^1$, $2^2$, . . . $2^n$.

In one embodiment of the instant invention, the binary factor chosen as $2^1$. Accordingly, the output line capability is increased by a factor of 2 allowing the pitch of the circuit configuration of the instant invention to be tailored to that of a ROS memory fabricated on the same chip while using fabrication ground rules which allow maximum ROS memory densities and, accordingly, maximum chip densities.

For the principle embodiment aforementioned, the circuit configuration of the present invention is characterized by a conventional decoder having a plurality of addresses ($A_{n-1}$ . . . $A_{n-n}$) at its input. Decoder clock pulse $\phi_1$, provided by an external system clock control, drives the conventional decoder providing a decoded valid address at its output. The decoded address in turn drives a complement array select device and an array select device. A generator address ($A_n$) drives address complement generator, the output of which drives an address generator. The output of the address complement generator also drives the complement array select device. Similarly, the output of the address generator drives the array select device. Accordingly, at the inputs of the aforementioned array select devices, the signals thereon are the complements of each other. Consequently, a decoded address from the conventional decoder is selected alternately, thereby driving the proper ROS memory cell or FET active device. Connected to the decoder lines which drive the ROS memory are a complement array flush device and an array flush device which flush or drain the residual charge from the lines to clear the ROS memory for the next access. The aforementioned array flush devices are switched on at the proper time by an array flush pulse $\phi_2$ provided by the external system clock control.

The foregoing and other objects features and advantages of the invention will be apparent from the following more particular description of the preferred embodiments of the invention as illustrated in the accompanying drawings.

DESCRIPTION OF THE PREFERRED EMBODIMENTS

The foregoing includes a description of a conventional decoder for comparison with the improved decoder configuration of this invention to assist in explaining the relationship of this invention to the conventional decoder. Also, since the conventional decoder is part of the combination of the instant invention, the integrated circuit fabrication of the conventional decoder, as done in the past, is also shown to depict the comparison between the conventional decoder and the decoder configuration of the instant invention. The operation of the improved decoder, according to the invention, is described hereinafter under the heading, "Statement of the Operation."

Figures 1A, 1B:
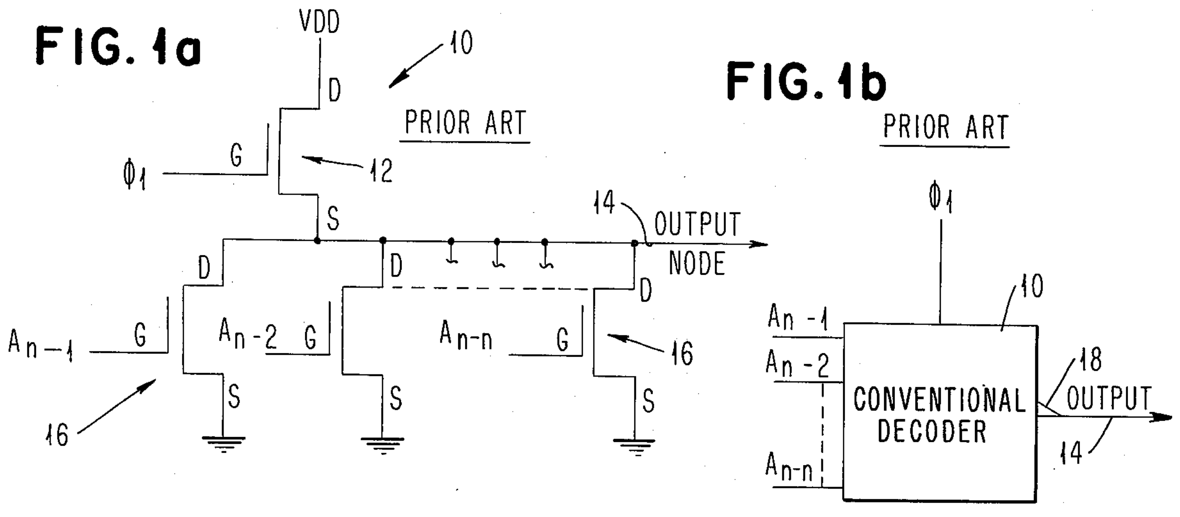
FIGS. 1*a–c* are schematic representations of a conventional prior art decoder circuit as utilized in the instant invention, a block diagram of said conventional decoder schematic and a fragmented plan view representation of an integrated circuit fabrication of the conventional decoder as done in the past.

Referring first to FIG. 1*a*, a conventional decoder 10 is depicted in schematic form. Conventional decoder 10, which utilizes MOSFET active devices, comprises a clock load device 12 having its drain connected to a positive voltage supply VDD, its gate driven by a decoder clock pulse $\phi_1$, and its source connected to output node or address line 14. Completing conventional decoder 10 are a plurality of decoder address switch devices 16 having their drains connected to output node 14, their sources connected to ground and their gates driven by a plurality of address signals ($A_{n-1} \ldots A_{n-n}$). As can be seen from the schematic representation in FIG. 1*a*, one output is available from the conventional decoder 10 regardless of the number of inputs provided. Also, a conversion or inversion of the input addresses are characteristic of the conventional decoder 10 of FIG. 1*a*.

Briefly, in FIG. 1*b*, conventional decoder 10 is represented in block diagram form, 14 being the output node or address line as previously described. Decoder clock pulse $\phi_1$, previously mentioned and the plurality of address signals ($A_{n-1} \ldots A_{n-n}$) complete the block diagram configuration of conventional decoder 10. Wedge 18 schematically depicts an inversion or conversion of the input addresses as previously described.

Figure 1C:
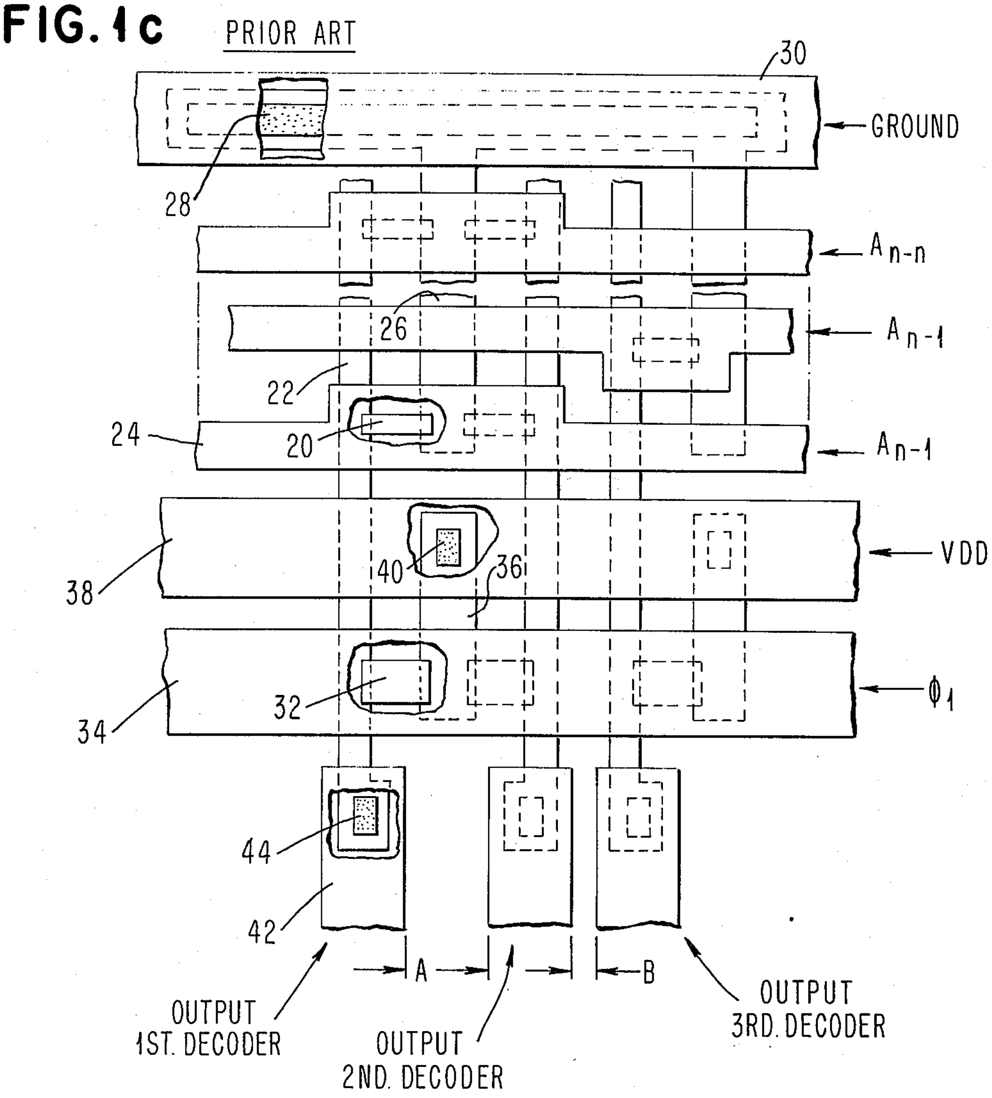

FIG. 1*c* is a fragmented plan view of an integrated circuit physical layout depicting three independent conventional decoder circuits of the type illustrated in FIG. 1*a*. Thin oxide address device 20 is sandwiched between interconnect diffusion bus 22 and address input aluminum bus 24. Thin oxide address device 20 is also sandwiched between ground diffusion bus 26 and address input aluminum bus 24. Metallic contact bus 28 is sandwiched between ground diffusion bus 26 and ground aluminum bus 30, thus completing an address switch device 16, as depicted schematically, in FIG. 1*a*. To complete a conventional decoder thin oxide load device 32 is sandwiched between interconnect diffusion bus 22 and clock input aluminum bus 34. Also, thin oxide load device 32 is sandwiched between drain diffusion bus 36 and clock input aluminum bus 34. Metallic contact 40 is sandwiched between drain diffusion bar 36 and powered aluminum bus 38. Finally, to complete the fabrication of the conventional decoder as depicted in FIG. 1*a*, metallic contact 44 is sandwiched between interconnect diffusion bus 22 and output aluminum bus 42.

The description as stated hereinabove for the fabrication of a conventional decoder, as depicted in FIG. 1*a*, will be similar for the remaining decoders shown in FIG. 1*c* and accordingly, will not be repeated. The fabrication can be extended in a vertical direction as shown in FIG. 1*c* to include as many address inputs as needed. The main significance of FIG. 1*c* is to show the pitch restriction when conventional decoders are utilized. Dimension "A" between the output of the first decoder and the output of the second decoder is larger than dimension "B" between the output of the second decoder and the third decoder. Thus, maximum density cannot be attained using conventional decoders as clearly shown in FIG. 1*c*. FIG. 1*c* is drawn to the same scale as FIG. 3, to be described hereinafter, to show the improvement in physical layout made possible by the present invention. It is apparent that the fabrication in FIG. 1*c* can be performed by those with ordinary skill in the art using well known semiconductor processing techniques.

Figure 2:
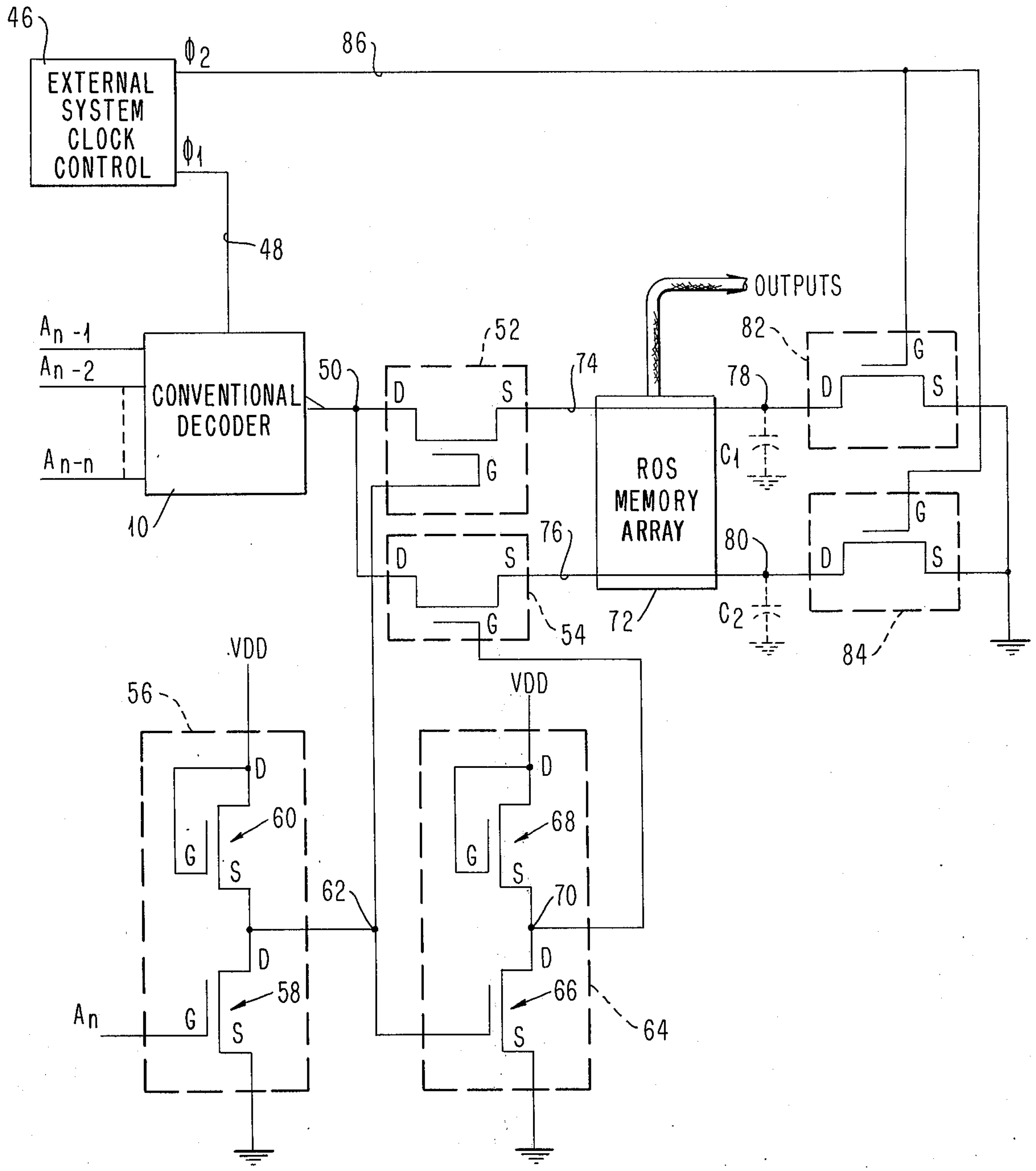
FIG. 2 depicts schematically and in block diagram form a decoding circuit in accordance with one embodiment of the present invention.

FIG. 2 depicts an embodiment of the present invention where the conventional decoder 10 is utilized in conjunction with other circuits, to be described hereinbelow, to double the output line capability of conventional decoder 10. Another way of looking at the embodiment of FIG. 2 is that the conventional decoders needed to perform the allocated functions have been decreased by one half.

External system clock control 46 generates decoder clock pulse $\phi_1$ on line 48. External system clock control 46 can be comprised of an oscillator that generates a system clock and the logic needed to produce the clock pulses necessary for the operation of the instant invention. The choice of design of external system clock control 46 is one open to anyone with ordinary skill in the art.

To continue, the output of conventional decoder 10 divides at node 50 feeding concurrently array select device 54 and complement array select device 52. Address complement generator 56, which comprises an address switch 58 and a load device 60, is driven by a generator address $A_n$. Accordingly, at node 62, the complement of $A_n$, i.e., $\overline{A_n}$, drives complement array select device 52 and address generator 64.

Address generator 64 similarly comprises an address switch 66 and a load device 68. Consequently, generator address output $A_n$ which drives array select device 54, is obtained at node 70. Depending on whether or not there is a valid address node 50, either complement array select device 52 or array select device 54 will turn on accessing ROS memory array 72. As is well known, ROS memory array 72 is made up of various MOSFET active devices interconnected in rows and columns forming a matrix. Parasitic capacitances C1 and C2 are representative of the relative high storage capacitance on lines 74 and 76. Accordingly, the aforementioned capacitances represented at nodes 78 and 80 have to be discharged for high speed operation of the ROS memory matrix. Thus, complement array flush device 82 and array flush device 84 are turned on by array flush pulse $\phi_2$ via line 86, thereby flushing the capacitances from lines 74 and 76 readying these lines for the next memory access.

Figure 3:
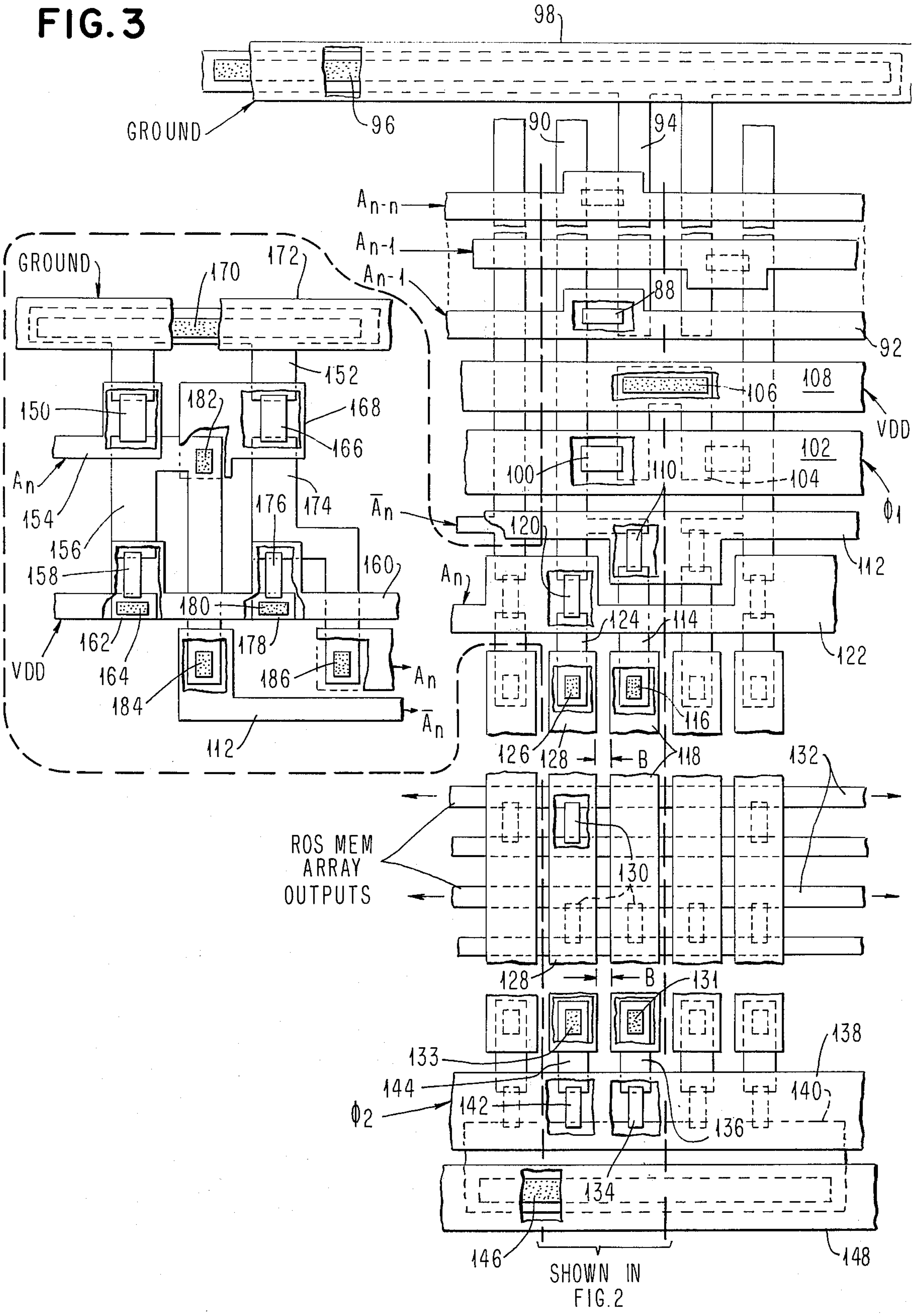
FIG. 3 is a fragmented plan view representation of an integrated circuit fabrication of the embodiment of FIG. 2.

FIG. 3 depicts a fragmented integrated circuit implementation of the circuit configuration of FIG. 2. A description of the fabrication between the dotted lines in FIG. 3 will suffice to enable those with ordinary skill in the art to fabricate the circuitry of FIG. 2. Moreover, since the fabrication shown in FIG. 1*c* and the fabrication shown in FIG. 3 utilizes the same physical layout ground rules, the advantages of the decoder configuration of the instant invention will be readily apparent from a comparison of FIG. 1*c* and FIG. 3. Also, it is apparent to those with ordinary skill in the art that the fabrication in FIG. 3 can be expanded vertically to include more address inputs and horizontally to include more output lines to drive a ROS memory array.

Starting with the fabrication of the single conventional decoder between the dotted lines in FIG. 3, thin oxide address device 88 is sandwiched between interconnect diffusion bus 90 and address input aluminum bus 92. Thin oxide address device 88 is also sandwiched between ground diffusion bus 94 and address input aluminum bus 92. To complete an address switch device 16 as depicted in FIG. 1*a*, metallic contact bus 96 is sandwiched between ground diffusion bus 94 and ground aluminum bus 98.

To complete a conventional decoder, thin oxide load device 100 is sandwiched between interconnect diffusion bus 90 and clock input aluminum bus 102. Also, thin oxide load device 100 is sandwiched between drain diffusion interconnect 104 and clock input aluminum bus 102, thus forming clock load device 12 as depicted in FIG. 1*a*. Metallic contact bar 106 is sandwiched between drain diffusion interconnect 104 and powered aluminum bus 108. This completes conventional decoder 10 as utilized in the instant invention depicted in FIG. 2.

To continue, as shown in FIG. 3, thin oxide complement select device 110 is sandwiched between interconnect diffusion bus 90 and interconnect complement aluminum bus 112. Also, thin oxide complement select device 110 is sandwiched between source complement diffusion bar 114 and interconnect complement aluminum bus 112 forming complement array select device 52 depicted in FIG. 2. Metallic contact 116 is sandwiched between source complement diffusion bar 114 and output aluminum bus 118 formulating line 74 depicted in FIG. 2. Thin oxide select device 120 is sandwiched between interconnect diffusion bus 90 and interconnect aluminum bus 122. Also, thin oxide select device 120 is sandwiched between source diffusion bar 124 and interconnect aluminum bus 122, thus formulating array select device 54 as depicted in FIG. 2. Metallic contact 126 is sandwiched between source diffusion bar 124 and output aluminum bus 128, thus formulating line 76 as depicted in FIG. 2.

It is important to note that output aluminum busses 118 and 128 correspond in pitch to the ROS memory inputs 118 and 128 and, accordingly, are simply an extension thereof. In FIG. 3, dimension B is uniform for all the decoder circuits of the instant invention and match the input pitch of the ROS memory. The decoder line outputs are on a narrower pitch than shown by the varying pitch A versus B in FIG. 1*a*. The critical dimension is dimension B which is the minimum pitch obtainable using the ROS memory construction shown in FIG. 3. The heart of the invention, to tailor the pitch of the decoder to the pitch of the ROS memory, is achieved by the fabrication in FIG. 3 made possible by the decoder configuration of FIG. 2.

The ROS memory array comprises a plurality of thin oxide active devices 130 sandwiched between a plurality of diffusion busses 132 and the aforementioned aluminum busses, e.g., 118 and 128. Also sandwished between aluminum busses 118 and 128 and complement flush diffusion bar 136 and flush diffusion bar 144 are metallic contacts 131 and 133. The outputs of the ROS memory, as depicted in FIG. 2, are taken from the plurality of diffusion busses 132 as shown in FIG. 3.

Thin oxide complement flush device 134 is sandwiched between complement flush diffusion bar 136 and flush input aluminum bus 138. Also, thin oxide complement flush device 134 is sandwiched between ground diffusion bus 140 and flush input aluminum bus 138, thus formulating complement array select device 82 as depicted in FIG. 2. Thin oxide flush device 142 is sandwiched between flush diffusion bar 144 and flush input aluminum bus 138. Also, thin oxide flush device 142 is sandwiched between ground diffusion bus 140 and flush input aluminum bus 138, thus formulating array flush device 84 as depicted in FIG. 2. Metallic contact bus 146 is sandwiched between ground diffusion bus 140 and ground aluminum bus 148 formulting the ground for the array flush devices as depicted in FIG. 2.

The physical layout of address complement generator 56 and address generator 64 of FIG. 2 is separate from the main fabrication hereinbefore described. The generators aforementioned are generally fabricated on a convenient area of the chip away from the main fabrication. Accordingly, a fragmented integrated circuit implementation of the generators are also shown in FIG. 3.

Thin oxide address complement generator device 150 is sandwiched between ground diffusion bus 152 and address complement generator input aluminum bus 154. Thin oxide address complement generator device 150 is also sandwiched between interconnect diffusion bar 156 and address complement generator input aluminum bus 154, thus formulating address switch 58 as depicted in FIG. 2.

To continue, thin oxide complement generator load device 158 is sandwiched between interconnect diffusion bar 156 and powered aluminum bus 160. Thin oxide complement generator load device 158 is also sandwiched between drain diffusion connect 162 and powered aluminum bus 160. Finally, metallic contact 164 is sandwiched between drain diffusion connect 162 and powered aluminum bus 160, thus completing load device 60 and, accordingly, address complement generator 56 as depicted in FIG. 2.

Still referring to FIG. 3, thin oxide address generator device 166 is sandwiched between ground diffusion bus 152 and internal aluminum interconnect 168. Metallic bus 170 is sandwiched between ground diffusion bus 152 and ground aluminum bus 172 formulating circuit ground for address complement generator 56 and address generator 64 as illustrated in FIG. 2. Thin oxide address generator device 166 is also sandwiched between interconnect diffusion bar 174 and internal aluminum interconnect 168, thus formulating address switch 66 as shown in FIG. 2.

Continuing, thin oxide generator load device 176 is sandwiched between interconnect diffusion bar 174 and powered aluminum bus 160. Thin oxide generator load device 176 is also sandwiched between drain diffusion connect 178 and powered aluminum bus 160. Finally, metallic contact 180 is sandwiched between drain diffusion connect 178 and powered aluminum bus 160, thus completing load device 68 and, accordingly, address generator 64 is depicted in FIG. 2.

Still referring to the physical layout of FIG. 3, metallic contact 182 is sandwiched between interconnect diffusion bar 156 and internal aluminum interconnect 168 forming node 62 as shown in FIG. 2. Also, metallic contact 184 is sandwiched between interconnect diffusion bar 156 and interconnect complement aluminum bus 112 forming the output line which drives complement array select device 52 as depicted in FIG. 2. Metallic contact 186 is sandwiched between interconnect diffusion bar 174 and interconnect aluminum bus 122 forming the output line which drives array select device 54 also shown in FIG. 2.

Figure 4A:
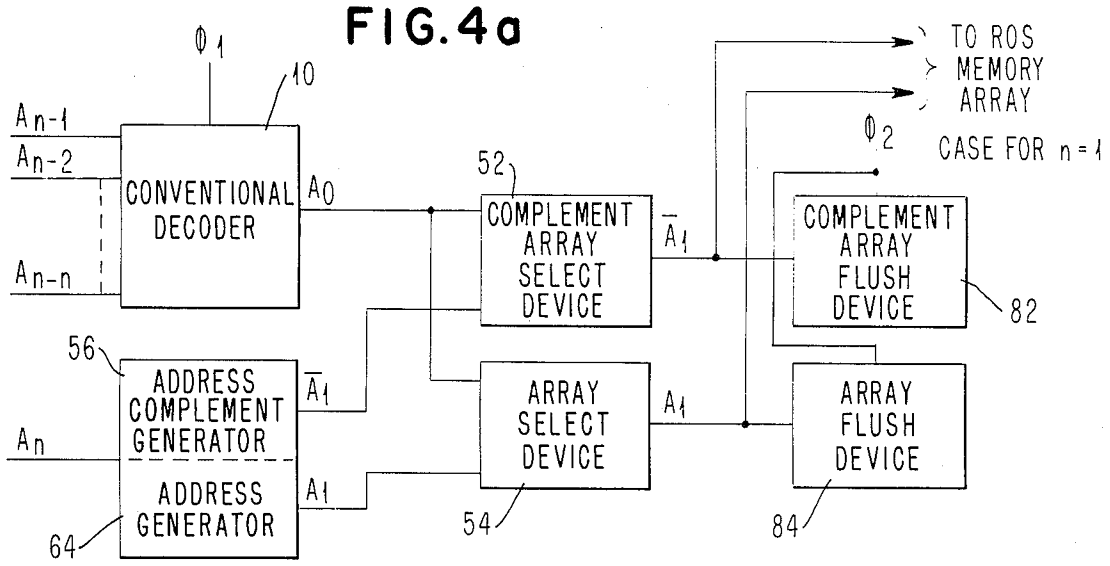
FIGS. 4*a–b* are a partial block diagram representation of the embodiment of FIG. 2 and a block diagram of a decoding circuit in accordance with another embodiment of the present invention representing a ROS memory accessing line increase of binary factor $2^n$.
Figure 4B:
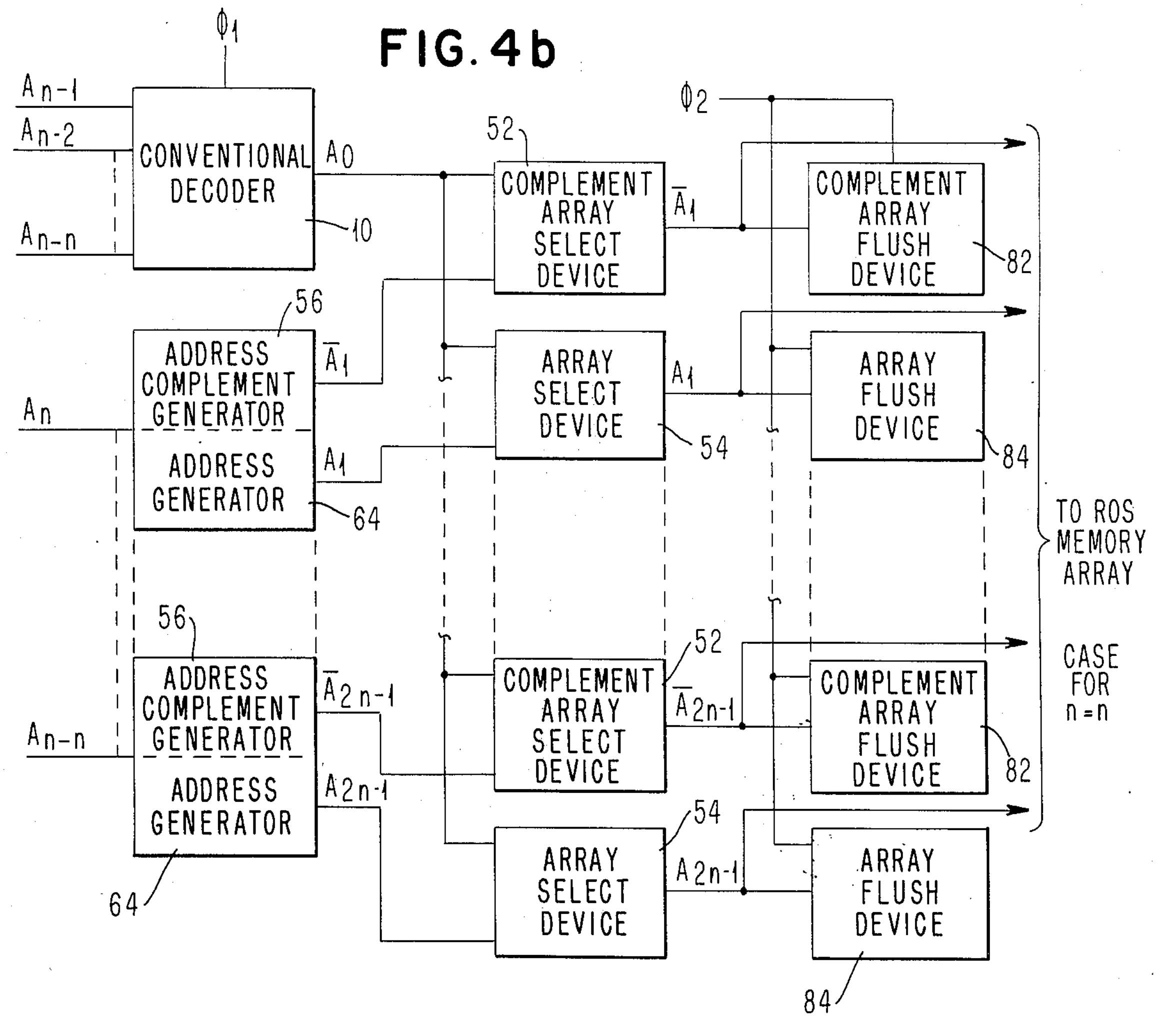

A unique embodiment of the instant invention as depicted in simple block diagram form in FIG. 4*b*. There has been described, hereinbefore, the various circuits comprising the blocks of FIGS. 4*a–b*. Moreover, to simplify, the description of FIG. 4*b*, i.e., the embodiment of present interest, FIG. 4*a* by comparison illustrates the simplified block form of the aforedescribed FIG. 2 embodiment.

As shown in FIG. 4*a*, for a binary factor 2 i.e., $n=1$, the single output of conventional decoder 10 generates an address $A_0$. Address $A_0$ becomes address $\overline{A}_1$, by means of complement array select device 52 and array select device 54 being driven by address complement generator 56 and address generator 64 respectively. The subscript 1 of the aforementioned address simply illustrates the condition $n=1$. For example, at the outputs of complement array select device 52 and array select device 54, $\overline{A}_1$ and $A_1$ represent single lines so that for the case of $n=1$, the single line of conventional decoder 10 carrying address $A_0$ is increased to two lines carrying addresses $\overline{A}_1$ and $A_1$ as depicted. Complement array flush device 82 and array flush device 84 flush the lines as described hereinbefore in conjunction with FIG. 2.

The principles employed in FIG. 4*a* can be expanded and, accordingly, the single line output of conventional decoder 10 can be increased to $2^n$ lines.

Briefly, in FIG. 4*b*, conventional decoder 10 feeds a plurality of complement array select devices 52 and a plurality of array select devices 54 in parallel as depicted. A plurality of address complement generators 56 and a plurality of address generators 64 drive the appropriate array select devices as illustrated in FIG. 4*b* and described hereinbefore. A plurality of addresses ($A_n \ldots A_{n+n}$) drive address complement generators 56. For each complement array select device 52, there is an output line and for each array select device 54, there is an output line. Accordingly, for the $2^n$ lines, half are decoded address lines and half are the complements thereof; therefore, the decoded address lines are ($A_1 \ldots A_2$ n = l) and the complement address lines are ($\overline{A}_1 \ldots \overline{A}_2$ n = l). Consequently, the single output line of conventional decoder 10 is increased by a binary factor of $2^n$ allowing a narrower pitch to be achieved so as to enable matching of the decoded lines with a ROS memory array input lines.

Finally, a plurality of complement array flush devices 82 for flushing lines ($\overline{A}_1 \ldots A_2$ n = l) and a plurality of array flush devices 84 for flushing lines ($\overline{A}_1 \ldots A_2$ n = l) are connected as shown in FIG. 4*b*.

STATEMENT OF THE OPERATION

Figure 5:
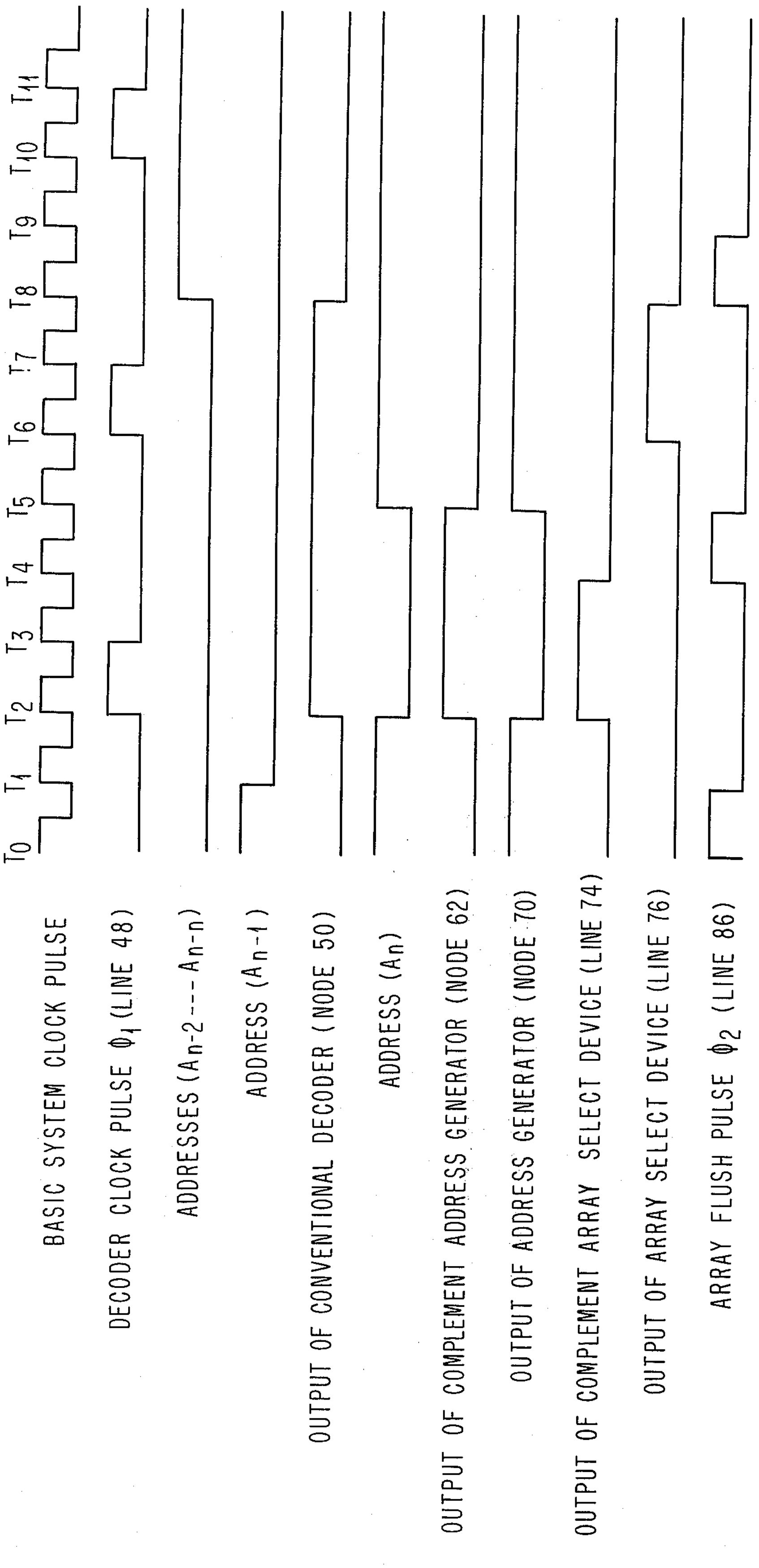
FIG. 5 is a timing diagram showing the interrelationship of the various wave forms of the instant invention as depicted in FIG. 2 during the operation thereof.

Details of the operation according to the invention, is explained in conjunction with FIGS. 2 and 5 viewed concurrently.

Referring to FIG. 2 and the timing diagram of FIG. 5, a basic system clock pulse is generated internally in external system clock control 46. This clock pulse wave form is shown in FIG. 5 to provide a reference standard for the discussion herein to follow.

At time $T_0$, decoder clock pulse $\phi_1$ is down, thus, the output from conventional decoder 10 is down as shown in FIG. 5. At $T_0$, generator address $A_n$ is up; therefore, the output of complement address generator 56 at node 62 is down. As shown in the timing diagram of FIG. 5, the output of address generator 64 at node 70 is up. Accordingly, the output of complement array select device 52 at line 74 is down. Also depicted in FIG. 5, the output of array select device 54 at line 76 is down at time $T_0$. Since array flush pulse $\phi_2$ is up, complement array flush device 82 and array flush device 84 are switched and, as a result, lines 74 and 76 are grounded or at a down level.

At time $T_1$, array flush pulse $\phi_2$ is at a down level. As can be seen from the wave forms of FIG. 5, none of the internal wave forms change at this time. But at $T_1$, address $A_{n-1}$, an input to conventional d-coder 10, is at a down level. No other changes take place at $T_1$ as can be seen from a perusal of FIG. 5.

At $T_2$, decoder clock pulse $\phi_1$ is up. Thus, the output of conventional decoder 10 is up because the AND function is satisfied. Also, at time $T_2$, address $A_n$ is at a down level; therefore, the output of complement address generator 56 at node 62 is up and the output of address generator 64 at node 70 is down. As a result of the aforementioned wave form changes, the output of complement array select device 52 at line 74 is up and the output of array select device 54 at line 76 does not change, as can be seen from FIG. 5. To summarize, at time $T_2$, complement array select device 52 is switch or selected as a result of the wave form at node 62 being at an up level. Accordingly, the output of conventional decoder 10 is selected by complement array select device 52. Array select device 54 has not been switched, thus, its output at line 76 stays as a down level. So ROS memory array 72 is being accessed via line 74 at this time.

Still referring to FIGS. 2 and 5 concurrently, at time $T_3$, decoder clock pulse $\phi_1$ is down but the output of conventional decoder 10 at node 50 does not change due to parastic capacitance at that node. The capacitance, aforementioned, will slowly discharge through leakage currents, but for all practical purposes, node 50 stays charged because the cycle time utilized is faster than the time it would take for leakage current to drain off the capacitance at node 50, thus bring the level down.

At time $T_4$, a new cycle begins. Array flush pulse $\phi_2$ is up, thereby, flushing the array of ROS memory 72 and the lines connected thereto, i.e., discharging the parasitic capacitances as depicted by $C_1$ and $C_2$ on lines 74 and 76 in FIG. 2. At time $T_5$, array flush pulse $\phi_2$ is down again. Also at time $T_5$, generator address $A_n$ is up and, accordingly, the output of address complement generator 56 at node 62 is down and the output of address generator 54 at node 70 is up as depicted in FIG. 5.

At time $T_6$, decoder clock pulse $\phi_1$ is up and the output of conventional decoder 10 at node 10 is already up due to the parastic capacitance aforementioned. If the output at node 50 of conventional decoder 10 had not been up, it would have switched up because addresses ($A_{n-1} \ldots A_{n-n}$) satisfy the AND function at this point of the timing cycle. Still at time $T_6$, array select device 54 is selected, i.e., switches, because the output of address generator 64 at node 70 is up. As a result, the output of array select device 54 at line 76 is up.

Consequently, at time $T_7$, decoder clock pulse $\phi_1$ at line 48 is down again, and as can be seen from the timing diagram of FIG. 5, all other wave forms remain at their previous levels due to the fact that addresses ($A_{n-1} \ldots A_{n-n}$) have not changed.

At time $T_8$, addresses ($A_{n-2} \ldots A_{n-n}$) are at an up level. Accordingly, the output of conventional decoder 10 at node 50 switches down discharging node 50. Also, the output of array select device 54 at line 76 switches down since the output of address generator 64 at node 70 is up. Array flush pulse $\phi_2$, at line 86, is up at $T_8$ which also can bring down the signal at line 76 because complement array flush device 82 and array flush device 84 are switched at this time by array flush pulse $\phi_2$, thereby, discharging the parasitic capacitances $C_1$ and $C_2$ from lines 74 and 76 as illustrated in FIG. 2.

At time $T_9$, array flush pulse $\phi_2$ from external system clock control 46 is down changing the state of complement array flush device 82 and array flush device 84. Addresses ($A_{n-2} \ldots A_{n-n}$) remain at an up level. At time $T_{10}$, decoder clock pulse $\phi_1$ at line 48 in FIG. 2 is up again, but the output of conventional decoder 10 at node 50 does not change because the inputs, i.e., addresses $A_{n-2} \ldots A_{n-n}$) to conventional decoder 10 are still at an up level as shown in FIG. 5 and address $A_{n-1}$ is down. Accordingly, the output of array select device 54 at line 76 is at a down level since array select device 54 is on and therefore connected to node 50 of conventional decoder 10. This is true because the output of address generator 64 at node 70 is still up at this time. Finally, at time $T_{11}$, decoder clock pulse $\phi_1$ at line 48 is down completing the second cycle. A new cycle begins at time $T_{11}$ and the total operation is repeated.

The timing diagram of FIG. 5 illustrates that some cycle time is lost due to the time necessary to flush the memory array and associated lines. As a result, total cycle time is increased slightly to compensate for the flushing operation which is necessary to clear the memory for a subsequent access. But access time, which is defined as the time from when addresses accessing the memory are valid until the time that data is received from the output of the memory array, has not been increased.

While the invention has been particularly described with reference to the preferred embodiments thereof, it will be understood by those skilled in the art that various changes in form and detail may be made therein without departing from the spirit and scope of the invention.

What is claimed is:

1. A MOSFET decoder circuit configuration for enhancing ROS memory densities for obtaining decoded output lines on a narrower pitch than conventional decoder circuits, wherein said decoded output lines of said conventional decoder are increased by a binary factor of $2^1$ comprising in combination:

an external system clock control for generating adecoder clock pulse and an array flush pulse;

a conventional decoder circuit driven by a plurality of decoder address inputs ($A_{n-1} \ldots A_{n-n}$) and said decoder clock pulse to obtain a valid decoding address on a single output line of said conventional decoder;

a complement array select device connected to said single output line of said conventional decoder;

an array select device connected to said single output line of said conventional decoder;

an address complement generator driven by a generator address input ($A_n$) to obtain a generator address output ($\bar{A}_n$) at the output of said address complement generator for driving said complement array select device to switch said complement array select device when said valid decoded address is present at said single output line of said conventional decoder thereby obtaining the complement of said valid decoded address at the output line of said complement array select device;

an address generator driven by said generator address output ($\bar{A}_n$) of said address complement generator to obtain a generator address output ($A_n$) at the output of said address generator for driving said array select device to switch said array select device when said valid decoded address is present at said single output line of said conventional decoder thereby obtaining said valid decoded address at the output line of said array select device;

a ROS memory array having a memory cell accessed by means of said output line of said complement array select device, and said ROS memory array having another memory cell accessed by means of said output line of said array select device, said memory cells being selected alternately be means of said complement array select device and said array select device;

a complement array flush device connected to said output line of said complement array select device for flushing the parasitic capacitance from said output line of said complement array select device readying said output line for a subsequent memory access, said complement array flush device being switched by said array flush pulse from said external system clock control;

an array flush device connected to said output line of said array select device for flushing the parasitic capacitance from said output line of said array select device readying said output line for a subsequent memory access, said array flush device being switched by said array flush pulse from said external system clock control;

whereby said single output line of said conventional decoder is increased by a binary factor of $2^1$ allowing a narrower pitch to be achieved so as to match said output lines of said complement array select device and said array select device to said ROS memory array input lines.

2. A decoder configuration in accordance with claim 1 wherein:

said address complement generator switching is accomplished by an address switch, said address switch being a MOSFET having a gate connected to said generator address input ($A_n$) and a source connected to ground; and said address complement generator further comprising a load device, said load device being a MOSFET having a gate connected to a drain and a voltage (VDD) and a source connected to a drain of said address switch forming said output line of said address complement generator.

3. A decoder configuration in accordance with claim 1 wherein:

said address generator switching is accomplished by an address switch, said address switch being a MOSFET having a gate connected to said output line of said address complement generator and a source connected to ground; and said address complement generator further comprising a load device, said load device being MOSFET having a gate connected to a drain and a voltage (VDD) and a source connected to a drain of said address switch forming said output line of said address generator.

4. A decoder configuration in accordance with claim 1 wherein said complement array select device is a MOSFET having a drain connected to said output of said conventional decoder, a gate connected to said output of said address complement generator and a source connected to said output line of said complement array select device.

5. A decoder configuration in accordance with claim 1 wherein said array select device is a MOSFET having a drain connected to said output of said conventional decoder, a gate connected to said output of said address generator and a source connected to said output line of said array select device.

6. A decoder configuration in accordance with claim 1 wherein said complement array flush device is a MOSFET having a drain connected to said output line of said complement array select device, a gate connected to said array flush pulse and a source connected to ground.

7. A decoder configuration in accordance with claim 1 wherein said array flush device is a MOSFET having a drain connected to said output line of said array select device, a gate connected to said array flush pulse and a source connected to ground.

8. A MOSFET decoder circuit configuration for increasing the decoded output lines of a conventional decoder by a binary factor of $2^n$ comprising in combination:

a conventional decoder circuit driven by a plurality of decoder address inputs ($A_{n-1} \ldots A_{n-n}$) and a decoder clock pulse to obtain a valid decoded address ($A_0$) on a single output line of said conventional decoder;

a plurality of $2^{n-1}$ complement array select devices connected in parallel to said single output line of said conventional decoder;

a plurality of $2^{n-1}$ array select devices connected in parallel to said single output line of said conventional decoder;

a plurality of $2^{n-1}$ address complement generators driven by a plurality of generator address inputs ($A_n \ldots A_{n+n}$) to obtain a plurality of generator address outputs ($\bar{A}_1 \ldots \bar{A}_2$ n=l) at the outputs of said plurality of address complement generators for driving said plurality of complement array select devices to switch said plurality of complement array select devices when said valid decoded address is present at said single output line of said conventional decoder thereby obtaining a plurality of complement valid decoded addresses ($\bar{A}_1 \ldots A_2$ n=l) at the output lines of said plurality of complement array select devices;

a plurality of $2^{n-1}$ address generators driven by said plurality of generator address outputs ($\bar{A}_1 \ldots \bar{A}_2$ n = l) of said plurality of address complement generators to obtain a plurality of generator address outputs ($A_1 \ldots A_2$ ) at the outputs of said plurality of address generators for driving said plurality of array select devices to switch said plurality of array select devices when said valid decoded address outputs ($A_1 \ldots A_2$ n=l) at the outputs of said conventional decoder thereby obtaining a plurality of valid decoded addresses ($A_1 \ldots A_2$ n=l) at the output lines of said plurality of array select devices;

a plurality of complement array flush devices one each being connected to said output lines of said plurality of complement array select devices for flushing parasitic capacitance from said output lines of said plurality of complement array select devices, said plurality of complement array select devices being driven by an array flush pulse;

a plurality of array flush device one each being connected to said output lines of said plurality of array select devices for flushing parasitic capacitance from said output lines of said plurality of array select devices, said plurality of array select devices being driven by said array flush pulse;

whereby said single output line of said conventional decoder is increased by a binary factor of $2^n$ allowing a narrower pitch to be achieved so as to enable matching of said output lines of said plurality of complement array select devices and said plurality of array select devices to a ROS memory array input lines.

* * * * *

UNITED STATES PATENT AND TRADEMARK OFFICE

CERTIFICATE OF CORRECTION

PATENT NO. : 3,909,808

DATED : September 30, 1975

INVENTOR(S) : William H. Cochran; Dale A. Heuer; Michael J. Sheehan

It is certified that error appears in the above-identified patent and that said Letters Patent are hereby corrected as shown below:

Column 8, lines 9 & 10, "$(A_1 \ldots A_2 n=1)$" should read --$(A_1 \ldots A_2 n-1)$--.

Column 8, lines 10 & 11, "$(\bar{A}_1 \ldots \bar{A}_2 n=1)$" should read --$(\bar{A}_1 \ldots \bar{A}_2 n \ldots -1)$--.

Column 8, line 17, "$(\bar{A}_1 \ldots A_2 n=1)$" should read --$(\bar{A}_1 \ldots A_2 n-1)$--.

Column 8, line 18, "$(\bar{A}_1 \ldots A_2 n=1)$" should read --$(\bar{A}_1 \ldots A_2 n-1)$--.

Column 10, line 20, "ade-" should read as: -- a de- --.

Column 12, line 18, "$(\bar{A}_1 \ldots \bar{A}_2 n=1)$" should read --$(\bar{A}_1 \ldots \bar{A}_2 n-1)$".

Column 12, lines 26 & 27, "$(\bar{A}_1 \ldots A_2 n=1)$" should read --$(\bar{A}_1 \ldots A_2 n-1)$--.

Column 12, lines 30 & 31, $(\bar{A}_1 \ldots \bar{A}_2 n=1)$" should read --$(\bar{A}_1 \ldots \bar{A}_2 n-1)$--.

Column 12, line 33, "$(A_1 \ldots A_2 \quad)$" should read --$(A_1 \ldots A_2 n-1)$--.

Column 12, line 37, "$(A_1 \ldots A_2 n=1)$" should read --$(A_1 \ldots A_2 n-1)$--.

Column 12, line 39, "$(A_1 \ldots A_2 n=1)$" should read --$(A_1 \ldots A_2 n-1)$--.

Signed and Sealed this

Twenty-first Day of September 1976

[SEAL]

*Attest:*

RUTH C. MASON
*Attesting Officer*

C. MARSHALL DANN
*Commissioner of Patents and Trademarks*